United States Patent
Wengrovitz et al.

(10) Patent No.: US 9,014,075 B2
(45) Date of Patent: Apr. 21, 2015

(54) WIDE AREA MIRRORING ROUTER

(75) Inventors: Michael S. Wengrovitz, Concord, MA (US); Aaron Surty, Toronto (CA)

(73) Assignee: Alcatel Lucent, Boulogne-Billancourt (FR)

( * ) Notice: Subject to any disclaimer, the term of this patent is extended or adjusted under 35 U.S.C. 154(b) by 396 days.

(21) Appl. No.: 13/272,358

(22) Filed: Oct. 13, 2011

(65) Prior Publication Data

US 2013/0094423 A1 Apr. 18, 2013

(51) Int. Cl.
*H04H 20/71* (2008.01)
*H04L 12/18* (2006.01)

(52) U.S. Cl.
CPC .......... *H04L 12/1836* (2013.01); *H04L 12/189* (2013.01)

(58) Field of Classification Search
USPC ........................................................ 370/312
See application file for complete search history.

(56) References Cited

U.S. PATENT DOCUMENTS

| | | |
|---|---|---|
| 7,656,822 B1 | 2/2010 | AbdelAziz et al. |
| 2003/0063608 A1* | 4/2003 | Moonen .......................... 370/390 |
| 2003/0101294 A1 | 5/2003 | Saint-Hilaire et al. |
| 2008/0069319 A1* | 3/2008 | Igoe ............... 379/90.01 |
| 2008/0092204 A1* | 4/2008 | Bryce et al. .................... 725/143 |
| 2010/0317332 A1* | 12/2010 | Bathiche et al. .............. 455/418 |

FOREIGN PATENT DOCUMENTS

| | | |
|---|---|---|
| EP | 1526445 A2 | 4/2005 |
| WO | 2006120590 A1 | 11/2006 |

* cited by examiner

*Primary Examiner* — Sulaiman Nooristany
(74) *Attorney, Agent, or Firm* — Garlick & Markison (57) ABSTRACT

A wide area mirroring router enables mobile device screen mirroring across a wide area network. The wide area mirroring router (WAMR) is in wireless communication with a mobile device to receive Internet Protocol (IP) packets, including multicast packets, containing data related to mirroring content displayed on the mobile device to a remote display device. The WAMR encapsulates the IP packets into envelopes for transmission via a tunnel to the remote display device over the wide area network.

16 Claims, 8 Drawing Sheets

WIDE AREA MIRRORING ROUTER

BACKGROUND OF THE INVENTION

1. Technical Field of the Invention

The present invention relates in general to screen mirroring systems, and in particular, to mirroring across wide area networks.

2. Description of Related Art

Screen mirroring systems enable a mobile device's screen to be simultaneously displayed in real-time on a monitor. For example, a user can mirror his/her mobile device's display to a nearby HDTV television set using a wired or wireless connection, so that photos, videos, and other electronic content displayed on the mobile device's screen are simultaneously displayed on the HDTV's large screen.

To facilitate screen mirroring in a home environment, a handheld mobile device, such as a tablet or smartphone, typically connects to the home's Internet router via WiFi. This WiFi connection transports the mirroring data. The router is also connected via one of its LAN ports to a digital media receiver (DMR) that can receive screen mirroring content, and the DMR subsequently outputs an HDMI video/audio stream to an audio/video-capable HMDI or HDTV monitor. A physical cable between the smartphone and DMR can also transport the mirroring data, instead of the WiFi connection.

Before screen mirroring can occur, the mobile device and DMR need to discover the existence of one another, preferably without the need for a person to manually configure and manage names, IP addresses and services descriptions in a centralized Domain Name System (DNS) server. For example, an IP multicast-based name and service query/broadcast mechanism, such as multicast Domain Name System (mDNS) can be used. In such an automatic plug-and-play environment, a newly-connected mobile device or DMR announces its name, IP address, and service capabilities via IP multicast across the local network. In addition, the newly-connected device also issues a multicast query, so that it discovers the names, IP addresses and capabilities of devices already connected to the local network. In this manner, all devices on the local network have a timely and up-to-date picture of all other devices on the local network.

Through this IP multicast mechanism, the mobile device might for example learn that there are two DMRs and two printers on the network, but would only offer-up the possibility for a user to select screen mirroring to either of the two DMR devices and not to the printers, since only the DMRs and not the printers advertised mirroring service capabilities. Once the user selects one of the two DMRs for mirroring, the mobile device subsequently sets up an IP unicast session to the DMR, using the IPV4 or IPV6 address also discovered during the IP multicast process.

Since most home networks are simple and flat, and have no routing (no NATting, etc.), this IP multicast-based plug-and-play mechanism works well. However, if the router is not multicast-capable or is not properly managed for propagating IP multicast information between the wireless and wired domains, end users can sometimes experience problems. In addition, currently, the mobile device and HDTV must be located physically nearby each other, due to electrical restrictions on cable length for wired mirroring, and due to network constraints relating to the IP multicast used in wireless mirroring. For example, even though two different homes may each be connected to the Internet, it is not currently possible to mirror a mobile device in the first home to the HDTV set in the second home, since IP multicast is not supported across the Internet.

Similar problems exist in corporate enterprise scenarios. For example, an enterprise worker in a conference room may be able to share the screen of his/her tablet with other colleagues using a large HDMI monitor, projector, or smartboard located in the same room. However, since most corporate networks do not enable multicast, that enterprise worker would not be able to share the screen of his/her tablet with colleagues in another conference room or location. In corporate environments, multicast traffic is typically entirely contained within a small domain and completely isolated from the corporate network. This is primarily due to the fact that not only does the multicast Doman Name System (mDNS) protocol not span multiple subnets, the mDNS protocol is a "chatty" protocol. Since each device multicasts announcements for the services it provides, and each device also multicasts queries for other available services, mDNS can generate significant volumes of corporate traffic.

Thus, although a WiFi router within a corporate conference room may be able to provide both multicast and unicast services locally, the WiFi router would only be able to provide unicast services across the wide-area corporate network. For example, a mobile device may still have access to resources on the corporate network via the WiFi router's WAN port. However, multicast messages would only be exchanged between local devices, and would be filtered before entering the wide area network (corporate LAN/WAN). In this manner, a mobile user connected to the conference room's WiFi router would only be able to share his/her screen with a large HDMI monitor, projector, or smartboard connected to the same WiFi router.

To provide screen mirroring throughout a corporation, a standard WiFi router can be deployed in each corporate conference room to enable a mobile user to mirror locally without impacting the corporate network. However, this architecture essentially consists of a series of islands that provide local, but not global, multicast connectivity.

Although local mirroring of a mobile device's screen to an HDTV monitor in the home or corporate setting can lead to satisfying consumer experiences, mirroring across longer distances via a wide-area network can be important and desirable in other applications, such as enterprise and business collaboration, public safety and first-responder medical situations and government, neighborhood or community scenarios. For example, an enterprise worker with a mobile device may want to collaborate and deliver a corporate viewgraph presentation to a group of other workers viewing a large screen in another location. As another example, a public safety or medical first-responder with a mobile device may need to collaborate and interact with experts in a remote location to show real-time maps or relay live video or sensor data.

Therefore, what is needed in these longer distance mirroring scenarios is a system and method for overcoming the IP multicast constraints intrinsic to the current implementation of wireless mirroring.

SUMMARY OF THE INVENTION

An apparatus, in one embodiment, includes a processor for receiving Internet Protocol (IP) packets, including multicast packets, containing data related to mirroring content displayed on a mobile device to a remote display device. The processor encapsulates the IP packets into envelopes for transmission via a tunnel to the remote display device. The apparatus further includes an interface for communicating the envelopes to the remote display device via the tunnel over a wide area network.

In an exemplary embodiment, the mobile device includes the apparatus and the interface is a wireless interface. In another exemplary embodiment, the apparatus is a wireless router in wireless communication with the mobile device and the interface is a wired or wireless network interface. In yet another exemplary embodiment, the apparatus is a digital media receiver, TV, projector or graphical monitoring device.

In a further embodiment, the processor filters the IP packets to prevent packets unrelated to mirroring of the content from being encapsulated into the envelopes. In yet a further embodiment, the processor encrypts the data prior to encapsulating the IP packets into the envelopes. In still a further embodiment, the processor provides a virtual Ethernet bridge for bridging a wireless domain coupling the mobile device to the apparatus and a wired domain coupling the apparatus to the wide area network.

In an additional embodiment, the processor receives additional content mirrored from a remote mobile device via the interface through an additional tunnel and transmits the additional content to a local display device for display of the additional content thereon. In yet another additional embodiment, the mobile device is a remote mobile device and the processor further receives the IP packets via the interface through an additional tunnel and bridges the tunnel and the additional tunnel together.

In another embodiment of the invention, a wide area mirroring router is provided. The router includes a transceiver in wireless communication with a mobile device for receiving Internet Protocol (IP) packets, including multicast packets, from the mobile device. The IP packets contain data related to mirroring content displayed on the mobile device to a remote display device. The router further includes a processor for encapsulating the IP packets into envelopes for transmission via a tunnel to the remote display device and a network interface for communicating the envelopes to a digital media receiver coupled to the remote display device via the tunnel over a wide area network.

In an exemplary embodiment, the tunnel is a User Datagram Protocol (UDP) or Transmission Control Protocol (TCP) tunnel. In another exemplary embodiment, the transceiver communicates with the mobile device via a WiFi communication link. In yet another exemplary embodiment, the multicast packets are multicast Domain Name System (DNS) packets. In still another exemplary embodiment, the wide area network includes at least one of a corporate Local Area Network (LAN), corporate Wide Area Network (WAN), mobile broadband network and the Internet.

In a further embodiment, the router also includes a memory maintaining IP tables, a virtual Ethernet bridging module executable by the processor for bridging a wireless domain coupling the mobile device to the router and a wired domain coupling the router to the wide area network, a filtering module executable by the processor for filtering the IP packets, using the IP tables, to prevent packets unrelated to mirroring of the content from being encapsulated into the envelopes and a virtual private network (VPN) adapter module for creating the tunnel and encapsulating the IP packets into the envelopes for transmission via the tunnel.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a wide area mirroring router (WAMR) is provided that allows a mobile device's screen to be mirrored to a remote display device anywhere in the world via any wide-area network. In one embodiment, the WAMR is a small, deployable, low-cost appliance containing special firmware, attached to the network. For example, the WAMR may be added as firmware to a standard WiFi router, thereby allowing the WiFi router to tunnel multicast information across the wide area network.

Figure 1:
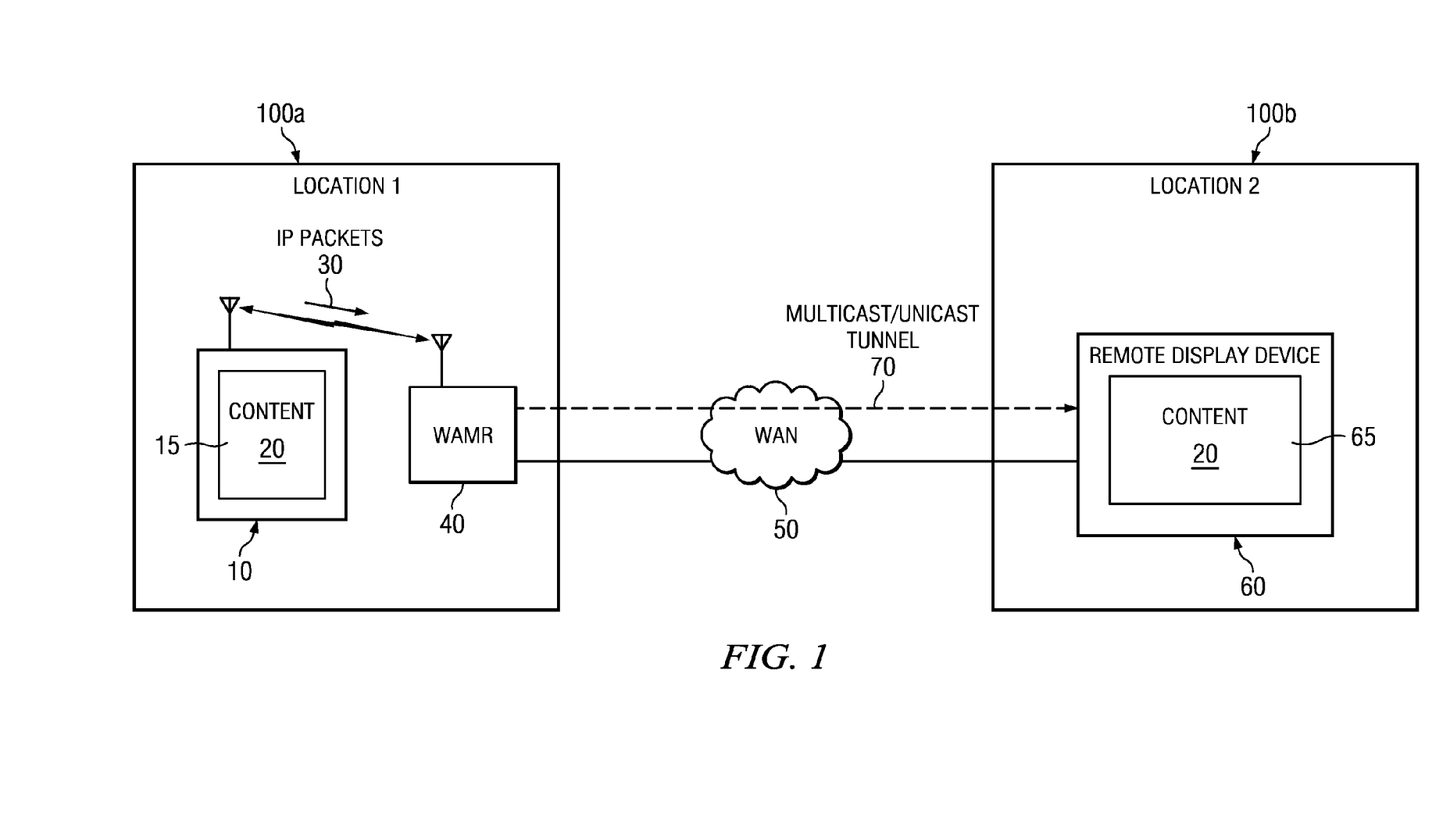
FIG. 1 illustrates an exemplary screen mirroring system for mirroring content on a mobile device screen across a wide area network, in accordance with embodiments of the present invention.

Referring now to FIG. 1, there is illustrated an exemplary screen mirroring system utilizing a WAMR 40 to minor content 20 displayed on a screen 15 of a mobile device 10 to a screen 65 of a remote display device 60, in accordance with embodiments of the present invention. The mobile device 10 may be, for example, a tablet, smartphone or other handheld wireless device. The remote display device 60 may be, for example, an HDTV, HDMI monitor, projector, smartboard or other type of display device. The WAMR 40 may be, for example, a standard WiFi router including WAMR firmware or a stand-alone device configured to perform screen mirroring for mobile devices. In other embodiments, as described in more detail below, the WAMR 40 may be implemented within other devices or within the mobile device 10 itself.

The mobile device 10 is capable of displaying content 20 on the mobile device's screen 15. By way of example, but not limitation, such content 20 may include photos, drawings, videos, icons, text, streaming media, a graphical user interface of a software application, such as an email/calendar/personal information manager application or other software application, a static or dynamic digital file, a digital presentation including one or more of text, graphics, sound, animated objects and multimedia objects, a web page of a website, a communication session, such as a video conference, web conference (i.e., whiteboard or desktop sharing), voice over Internet Protocol (VoIP) call, video call, or instant messaging session and other real-time and non-real-time data.

The WAMR 40 is in wireless communication with the mobile device 10 via, for example, an 802.11a or 802.11b/g secured WiFi link, to receive the content 20 to be mirrored to the remote display device 60. For example, a user of the mobile device 10 may want to review a project schedule, deliver a viewgraph presentation including animations and slide transitions, demonstrate real-time operation of various applications, browse the web, watch a multimedia movie or project the video/audio from any real-time communication application on the user's mobile device 10 to other people viewing the remote display device 10.

However, as shown in FIG. 1, the WAMR 40 and the mobile device 10 are within a first location 100a (Location 1), whereas the remote display device 60 is within a second location 100b (Location 2). Therefore, in order to mirror the content 20 displayed on the screen 15 of the mobile device 10 to the screen 65 of the remote display device 60, the WAMR 40 is coupled to a wide area network (WAN) 50. As used herein, the term "WAN" refers to one or more of a corporate/campus local area network, corporate or public WAN, broadband mobile network and the Internet. For example, the WAMR 40 may include a WAN port that is connected to a corporate or campus LAN or directly connected to the Internet, via a wired broadband connection, via a MiFi 3G/4G router, or by other means.

More specifically, the WAMR 40 is configured to receive and processes Internet Protocol (IP) packets 30, including IP multicast packets, from the mobile device 10. As used herein, the term "IP multicast packets" refers to discovery packets, such as multicast Domain Name System (mDNS) packets, that enable the mobile device 10 to discover and connect to other devices coupled to the WAMR 40. For example, the mobile device 10 can transmit IP multicast packets that announce its name, IP address, and service capabilities across the local network serviced by the WAMR 40, so that the other devices on this local network receive, learn and store this information. In similar fashion, the mobile device 10 can issue a multicast query so that it discovers the names, IP addresses and capabilities of devices already connected to the local network.

Traditionally, mDNS packets were only able to be transmitted within a multicast domain (local network). As used herein, the term "multicast domain" includes all devices directly physically connected (e.g., via CAT-5 or other cable/wire) to a WiFi router and/or directly wirelessly connected (e.g., via a wireless radio frequency (RF) communication link) to a WiFi router.

However, in accordance with embodiments of the present invention, the WAMR 40 enables IP multicast packets to be transmitted between multicast domains. For example, as shown in FIG. 1, the WAMR 40 services Location 1 (which forms a first multicast domain) and is capable of transmitting IP multicast packets originated by devices within Location 1 to Location 2 (which forms a second multicast domain). Location 1 may be, for example, a home, corporate conference room, school classroom, government office, hotspot or other location offering WiFi service. Location 2 may be, for example, another home, a corporate conference room (or other room) within the same building as Location 1 or within another building than Location 1 or any other location serviced by a different WiFi router than Location 1.

The WAMR 40 transmits the IP multicast packets from Location 1 (first multicast domain) to Location 2 (second multicast domain) by creating a multicast/unicast tunnel 70 between the two multicast domains, thus creating a "virtual multicast domain" between the two locations. Likewise, the WAMR 40 receives IP multicast packets originated by devices within Location 2 via the tunnel 70. For example, the tunnel 70 can be a User Datagram Protocol (UDP) or Transmission Control Protocol (TCP) tunnel. Through the transmission/reception of IP multicast packets via the tunnel 70, the mobile device 10 "discovers" the remote display device 60 and can subsequently set up an IP unicast session to the remote display device 60 via the tunnel 70 to minor content displayed on the mobile device's screen 15 to the remote display device's screen 65.

In an exemplary operation, the WAMR 40 receives IP packets 30 from the mobile device 10 containing data related to mirroring content 20 displayed on the mobile device's screen 15 to another remote display device 60. As mentioned above, such IP packets can include IP multicast packets for use in discovering and connecting to the remote display device 60 and unicast packets containing the mirrored content. Upon receiving the IP packets 30, the WAMR 40 encapsulates the IP packets into envelopes, creates (sets up) a tunnel 70 between the WAMR 40 in the first multicast domain (Location 1) and the remote display device 60 in the second multicast domain (Location 2) and transmits the envelopes to the remote display device 60 via the tunnel 70. In some embodiments, the WAMR 40 may also encrypt the data prior to encapsulating the IP packets into envelopes.

Although not shown in FIG. 1, the remote display device 60 receives the content 20 via an additional WAMR servicing Location 2 and a digital media receiver (DMR) coupled to the remote display device 60 and the additional WAMR. The DMR operates to decompress, decrypt (if necessary), process, and convert the IP data forwarded from the additional WAMR in Location 2, and then renders an HDMI digital video/audio stream that is sent to the remote display device 60. In some embodiments, the DMR and/or additional WAMR may be incorporated within the remote display device 60. As such, for simplicity, the additional WAMR and DMR have been excluded from FIG. 1.

It should be noted that although only one mobile device 10 is shown coupled to the WAMR 40 in Location 1, in other embodiments, two or more mobile devices 10 in Location 1 can selectively take turns and sharing their screens for group collaboration. For example, a user can interact with his/her mobile device's graphical user interface (GUI), select the name of the remote display device 60, and check the box for mirroring to commence to interrupt another user's screen mirroring that is currently being performed.

It should further be noted that if the WAN 50 is a corporate network, multicast traffic does flow across the corporate network. However, since only a few devices contribute to the IP multicast traffic, versus potentially hundreds or thousands of devices across an entire campus or corporate network, the additional traffic on the network is not significant. For example, a typical conference room would contain only a single display device and only a single (or a few) mobile devices contributing multicast traffic to the corporate network. In addition, the IP multicast traffic is used solely for device discovery, and not for the higher-bandwidth media mirroring exchange itself.

In addition, in some embodiments, the WAMR 40 may also filter other multicast packets unrelated to mirroring from entering the tunnel 70. Furthermore, the WAMR's WiFi may also be managed to have a lower power level, so that only users inside the conference room can associate with the WAMR, and/or the WAMR might only allow some set of MAC addresses or a limited of its number of DHCP subscribers to access WAMR services. As such, the WAMR 40 can vastly reduce the quantity of undesirable multicast traffic across a corporate network.

Figure 2A:
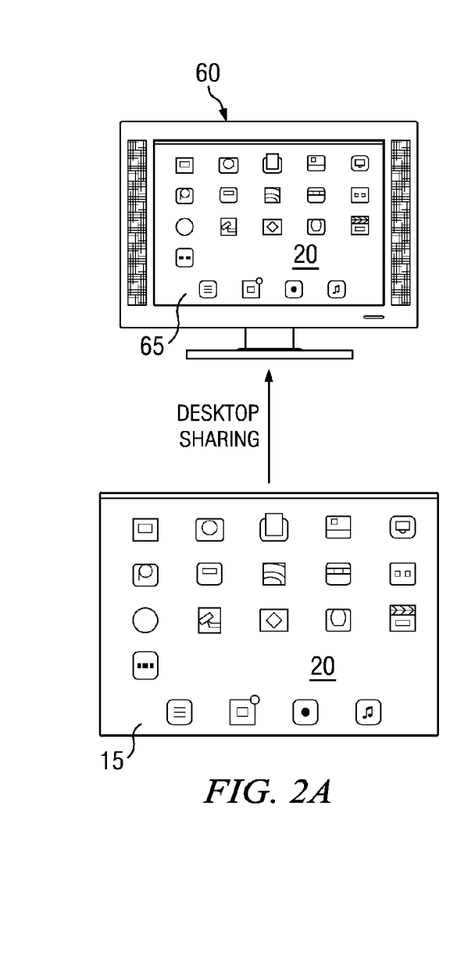
FIGS. 2A-2C illustrate exemplary content mirrored from a screen of a mobile device to a remote display device, in accordance with embodiments of the present invention.
Figure 2B:
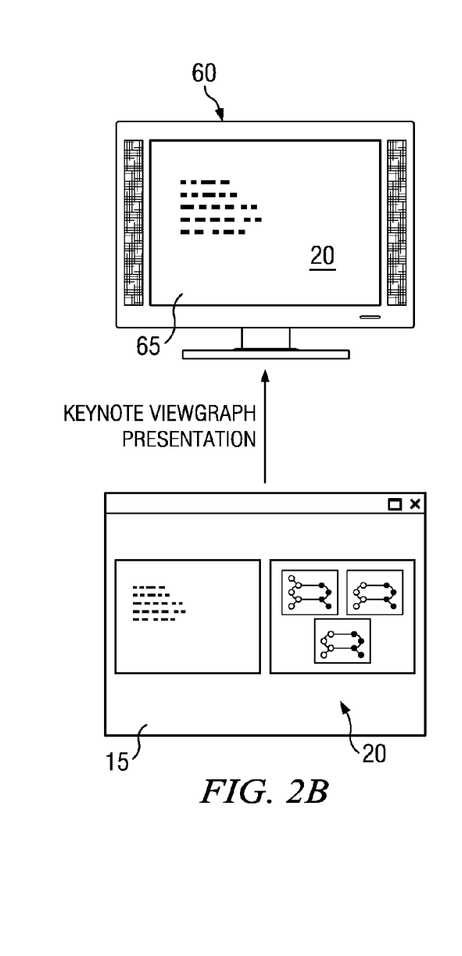
Figure 2C:
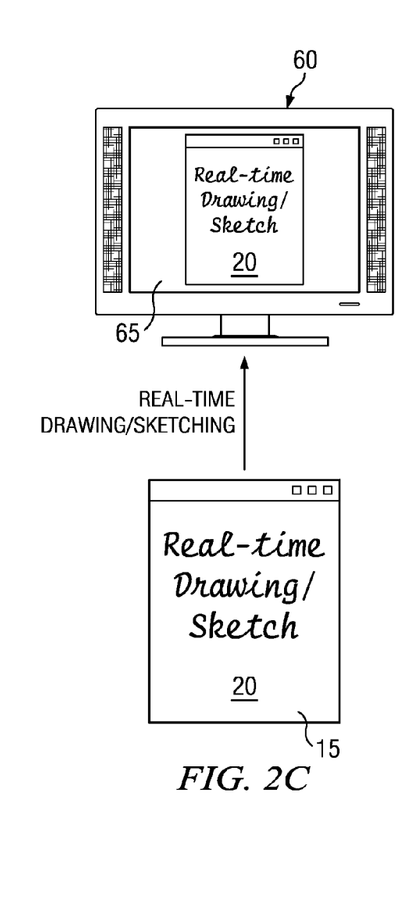

FIGS. 2A-2C are screenshots of a mobile device mirroring content 20 to a remote display device 60. As shown in FIG. 2A, one example of content 20 that can be mirrored to the remote display device 60 is desktop sharing. As the mobile device user interacts with the GUI (i.e., swipes, pinches/expands, selects, etc.), everything on the mobile device's screen 15 is simultaneously displayed on the screen 65 of the remote display device 60. In another example, as shown in FIG. 2B, a presentation is being delivered, such that the mobile device user (presenter) sees both the present viewgraph and the next viewgraph on the mobile device's screen 15, whereas the people viewing the remote display device 60 see only the present viewgraph. This is convenient for the presenter since he/she is reminded during the presentation's delivery of what is coming up next. In yet another example, as shown in FIG. 2C, a drawing/sketching application running on the mobile device is mirrored to the remote display device 60, so that diagrams, architectures, notes and sketches created by the mobile device user are immediately displayed on the screen 65 of the remote display device 60.

Figure 3:
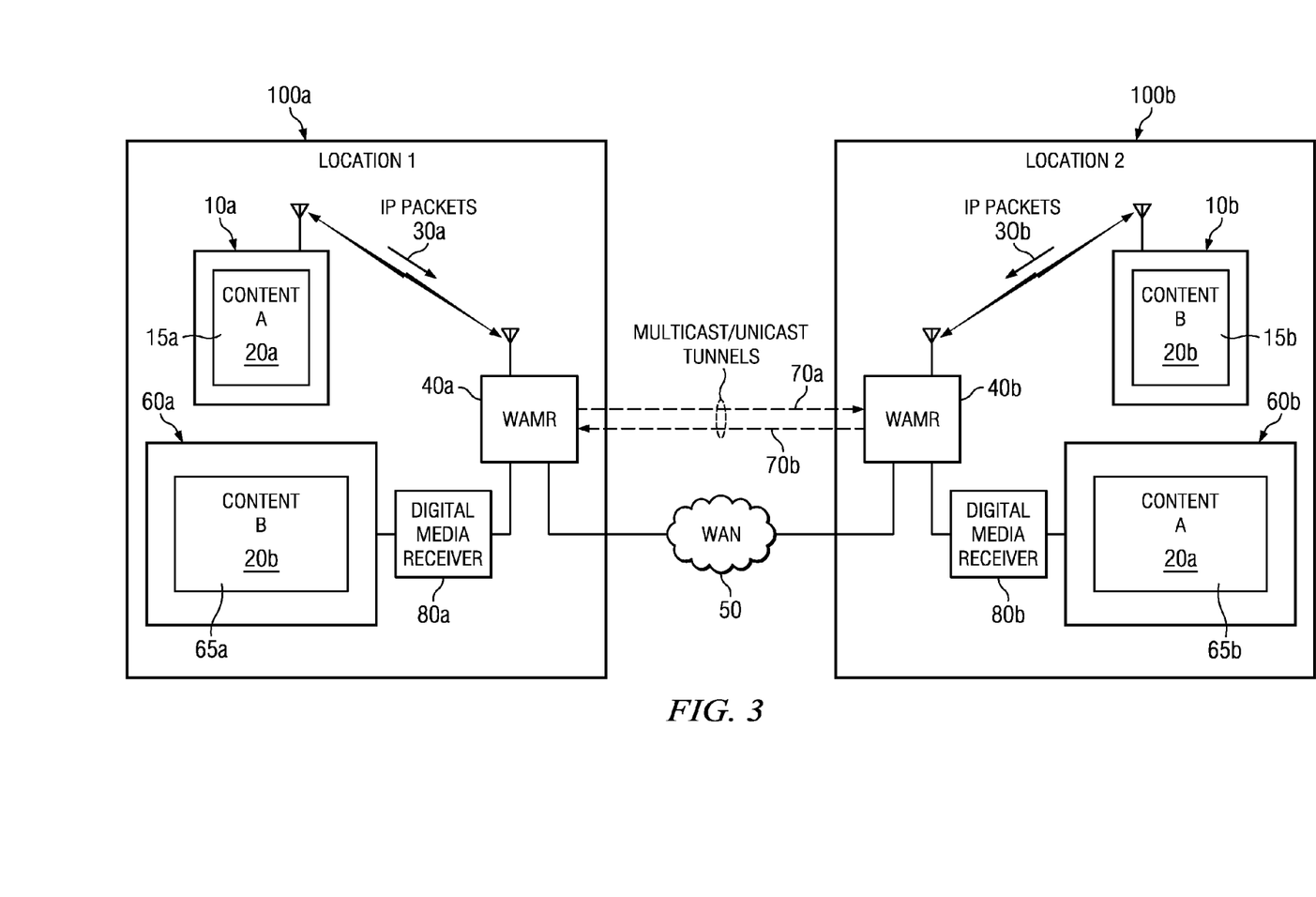
FIG. 3 illustrates another exemplary configuration of the screen mirroring system, in accordance with embodiments of the present invention.

FIG. 3 illustrates another exemplary configuration of the screen mirroring system, in accordance with embodiments of the present invention. In FIG. 3, two WAMRs 40a and 40b are used to interconnect two locations 100a and 100b (Location 1 and Location 2) separated by a WAN 50 (e.g., a wide-area corporate network or the Internet). Location 1 includes WAMR 40a, mobile device 10a, digital media receiver (DMR) 80a and display device 60a. Location 2 includes WAMR 40b, mobile device 10b, digital media receiver (DMR) 80b and display device 60b.

To interconnect Location 1 and Location 2, WAMRs 40a and 40b create multicast/unicast tunnels 70a and 70b over the WAN 50. IP multicast traffic (i.e., IP packets 30a) originated by devices within Location 1 (e.g., by mobile device 10a and DMR 80a) are transmitted to devices within Location 2 (e.g., to mobile device 10b and DMR 80b) via tunnel 70a, while IP multicast traffic (i.e., IP packets 30b) originated by devices within Location 2 (e.g., by mobile device 10b and DMR 80b) are transmitted to devices within Location 1 (e.g., to mobile device 10a and DMR 80a) via tunnel 70b. As described above, the IP multicast traffic is used for discovery of devices for the purpose of screen mirroring.

Once all devices within Location 1 and Location 2 are aware of each other, the mobile devices 10a and 10b within Locations 1 and 2 can mirror content 20a and 20b to any of the display devices 60a and 60b within Locations 1 and 2. If mirroring occurs over the WAN 50 (i.e., to a display device remote from the originating mobile device), unicast traffic (e.g., IP packets 30a and 30b) related to the mirroring is transmitted over tunnels 70a and 70b in the same manner as described above with respect to the IP multicast traffic. If mirroring occurs locally (e.g., from mobile device 10a to display device 60a), IP packets 30a are not transmitted over the WAN 50, and instead are directly routed to DMR 80a without encapsulation.

In an exemplary operation, a user operating one of the mobile devices 10a or 10b can select one of the display devices 60a and 60b to mirror content to. For example, when a user exposes a wireless mirroring GUI on mobile device 10a, one or more local/remote display device choices (e.g., local display device 60a and remote display device 60b) are displayed for selection. Once the user selects one of the display devices (e.g., remote display device 60b) for screen mirroring, everything (all content 20a) on the mobile device's screen 15a is simultaneously displayed on the screen 65b of the selected display device 60b via tunnel 70a. More specifically, all content 20a displayed on mobile device 10a is wirelessly transmitted to WAMR 40a within IP packets 30a, which encapsulates the IP packets 30a into envelopes and transmits the envelopes to WAMR 40b via tunnel 70a. WAMR 40b decapsulates the IP packets 30a from the envelopes and relays the IP packets 30a to DMR 80b via a wired or wireless connection. DMR 80b decompresses, decrypts (if necessary), processes, and converts the content 20a within the IP packets 30a into an HDMI digital video/audio stream that is sent to the remote display device 60b for display thereon.

Likewise, when a user exposes a wireless mirroring GUI on mobile device 10b, one or more local/remote display device choices (e.g., local display device 60b and remote display device 60a) are displayed for selection. Once the user selects one of the display devices (e.g., remote display device 60a) for screen mirroring, the content 20b on the mobile device's screen 15b is simultaneously displayed on the screen 65a of the selected display device 60a via tunnel 70b. More specifically, all content 20b displayed on mobile device 10b is wirelessly transmitted to WAMR 40b within IP packets 30b, which encapsulates the IP packets 30b into envelopes and transmits the envelopes to WAMR 40a via tunnel 70b. WAMR 40a decapsulates the IP packets 30b from the envelopes and relays the IP packets 30b to DMR 80a via a wired or wireless connection. DMR 80a decompresses, processes, and converts the content 20b within the IP packets 30b into an HDMI digital video/audio stream that is sent to the remote display device 60a for display thereon.

The two mirroring sessions can be performed at different times or simultaneously. Simultaneous mirroring may be useful, for example, in a conference room to conference room group collaboration and in various video conference scenarios. For example, assuming a video/audio client call is occurring between Locations 1 and 2, Location 1's large display screen 65a can show the camera from a mobile device 10b at Location 2, whereas Location 2's large display screen 65b can show the camera from a mobile device 10a at Location 1. In this way, multiple people at one location are able to conveniently view people at the other location for an improved collaboration experience.

Figure 4:
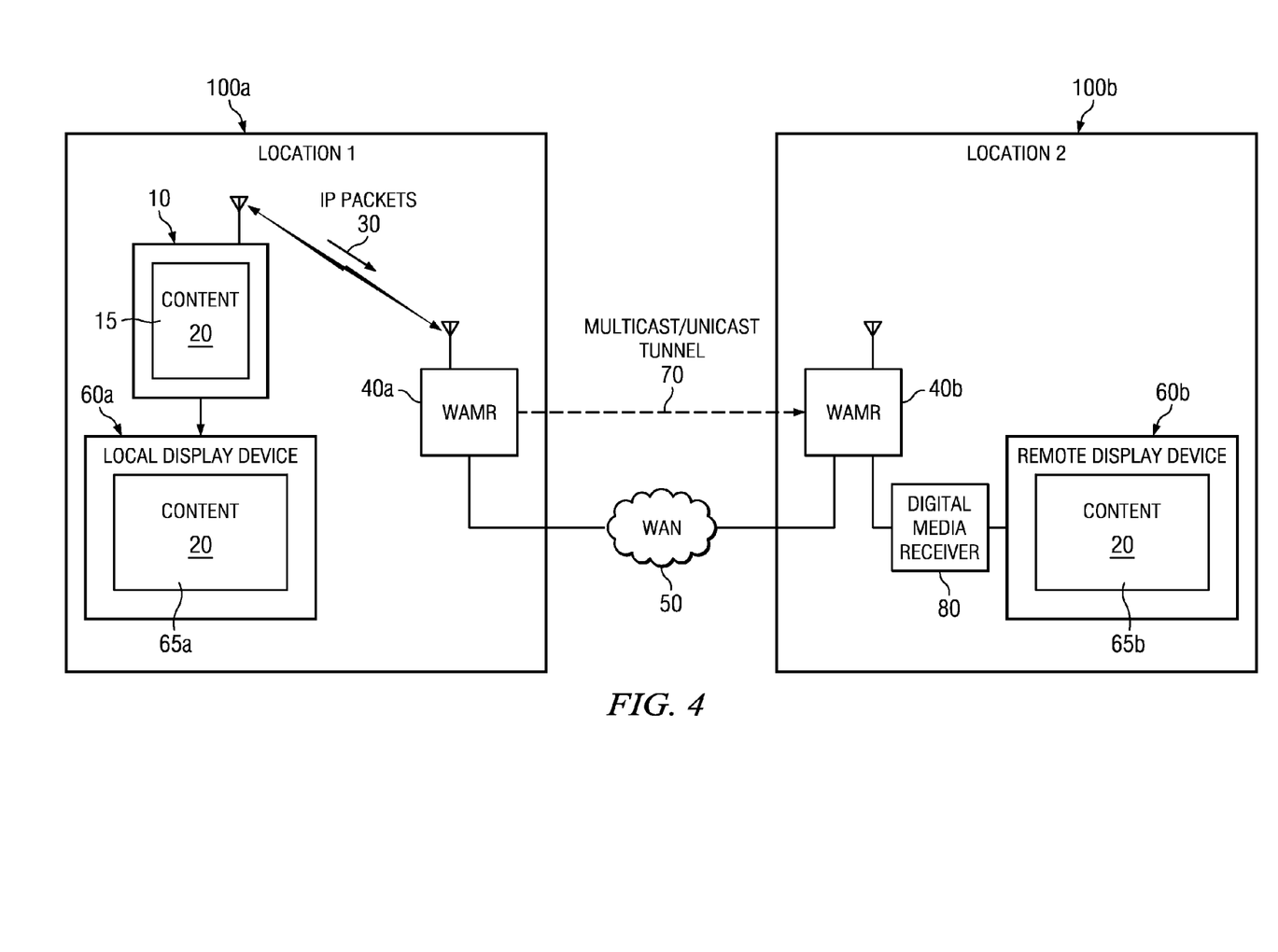
FIG. 4 illustrates yet another exemplary configuration of the screen mirroring system, in accordance with embodiments of the present invention.

FIG. 4 illustrates yet another exemplary configuration of the screen mirroring system, in accordance with embodiments of the present invention. In FIG. 4, substantially simultaneous local and remote mirroring of content 20 displayed on the screen 15 of mobile device 10 is depicted. Local mirroring is achieved via a hardwired connection between the mobile device 10 and the local display device 60a, whereas remote mirroring is achieved via the wireless connection with WAMR 40a.

In an exemplary embodiment, the hardwired connection between mobile device 10 and local display device 60a is VGA-based. Since most projectors and HDTVs support VGA connections, and VGA cables are readily available commercially for mobile devices, local mirroring can be easily accomplished.

For the remote mirroring, content 20 displayed on the screen 15 of mobile device 10 is wirelessly transmitted within IP packets 30 to WAMR 40a servicing Location 1. WAMR 40a encapsulates the IP packets 30 into envelopes and transmits the envelopes to WAMR 40b servicing Location 2 via tunnel 70 over WAN 50. WAMR 40b decapsulates the IP packets 30 from the envelopes and relays the IP packets 30 to DMR 80 via a wired or wireless connection. DMR 80 decompresses, processes, and converts the content 20 within the IP packets 30 into an HDMI digital video/audio stream that is sent to the remote display device 60b for display on the remote display device's screen 65b at substantially the same time as the content 20 is displayed on the local display device's screen 65a. Thus, a user operating mobile device 10 can substantially simultaneously deliver a presentation to an audience in the same conference room (Location 1) as well as to an audience in the remote conference room (Location 2).

Figure 5:
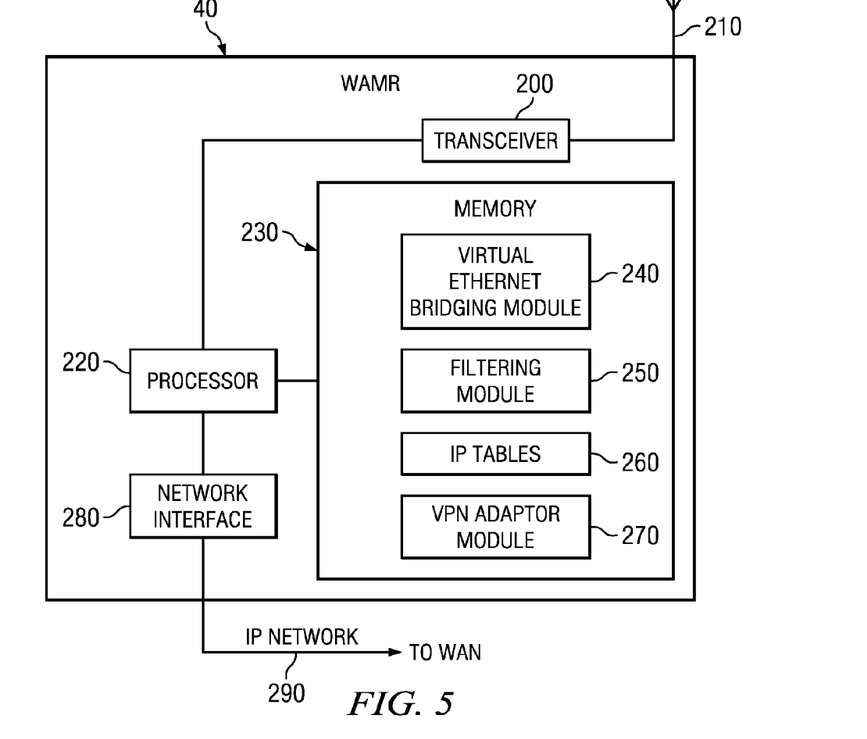
FIG. 5 is a block diagram illustrating exemplary components of a wide area mirroring router (WAMR) in the screen mirroring system, in accordance with embodiments of the present invention.

FIG. 5 is a block diagram illustrating exemplary components of a wide area mirroring router (WAMR) 40 in the screen mirroring system, in accordance with embodiments of the present invention. The WAMR 40 includes a transceiver 200, antenna 210, processor 220, memory 230 and network interface 280. The transceiver 200 wirelessly transmits/receives IP packets to/from mobile devices via antenna 210. In some embodiments, the transceiver 200 and antenna 210 are host components of a device including WAMR functionality. For example, if WAMR firmware is added to a standard WiFi router, the WAMR 40 would utilize the existing transceiver and antenna of the WiFi router.

The network interface 280 is coupled to a packet-switched (IP) network 290 to communicate with a WAN, such as a corporate or campus local area network (LAN), corporate or public WAN, mobile broadband network and/or the Internet. In some embodiments, the IP network 290 is the WAN, while in other embodiments, the IP network 290 connects the WAMR 40 to the WAN.

Thus, as used herein, the term "network interface" refers to the point of interconnection between the WAMR 40 and a private or public, wired or wireless packet-switched network 290. In embodiments in which the WAMR 40 has a wired connection to the IP network 290, the network interface 280 is generally understood to be a network interface controller (NIC). In embodiments in which the WAMR 40 has a wireless connection to the IP network 290, the network interface 280 is generally understood to be a wireless network interface controller (WNIC) that wirelessly communicates with a mobile broadband network, such as the Long Term Evolution (LTE) network. In either network interface embodiment, the network interface 280 may be an existing component of a host device of the WAMR 40.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

In some embodiments, the processor 220 and/or memory 230 may be implemented as software/firmware installed on an existing device, such as a WiFi router. In other embodiments, the processor 220 may be a host component, while the memory 230 is implemented as software/firmware. In still other embodiments, both the processor 220 and memory 230 may be host components, with the WAMR functionality being implemented as software downloaded into the memory 230.

The memory 230 may include one or more of a virtual Ethernet bridging module 240, filtering module 250, IP tables 260 and a Virtual Private Network (VPN) adapter module 270. The VPN adapter module 270, alone or in combination with one or more of the virtual Ethernet bridging module 240, filtering module 250 and IP tables 260, forms the "WAMR functionality" referred to herein.

The processor 220 is coupled to the memory 230 to execute one or more of the virtual Ethernet bridging module 240, filtering module 250 and VPN adapter module 270. For example, in embodiments in which the WAMR 40 has a wired connection to a corporate or campus LAN 290, the processor 220 can execute the virtual Ethernet bridging module 240 to bridge the WiFi wireless LAN and wired LAN, so IP packets including multicast can travel between the wireless and wired domains. The virtual Ethernet bridging module 240 transparently combines IP data, including IPv4 and IPv6 between the LAN, the WLAN and one or more tunnel interfaces.

The processor 220 may further execute the filtering module 250 to filter received IP packets, using for example, the IP tables 260 or other means, so that only IP packets related to mirroring (i.e., IP multicast to 224.0.0.251 and unicast to/from the TCP/IP mirroring ports) are passed. For example, since each location preferably has its own DHCP server so that the default gateway is local, DHCP requests may be filtered by the filtering module 250 and not passed, so that one location does not receive via DHCP the IP parameters associated with a different location. In another embodiment, the filtering module 260 may filter the IP packets so as to only allow multicast and IPv6.

The processor 220 further executes the VPN adapter module 270 to encapsulate IP packets received from local mobile devices into envelopes and to create a UDP or TCP tunnel through which the envelopes are transmitted over the IP network 290 via the network interface 280 to one or more other WAMR's in remote locations. The VPN adapter module 270 ensures that all IP packets relating to mirroring, including multicast packets, pass through a single socket connection. Data in the WAMR tunnel can also be encrypted by the VPN adapter module 270 prior to encapsulation, which may be important in cases where WAMRs at multiple locations are connected via an insecure network.

Figure 6:
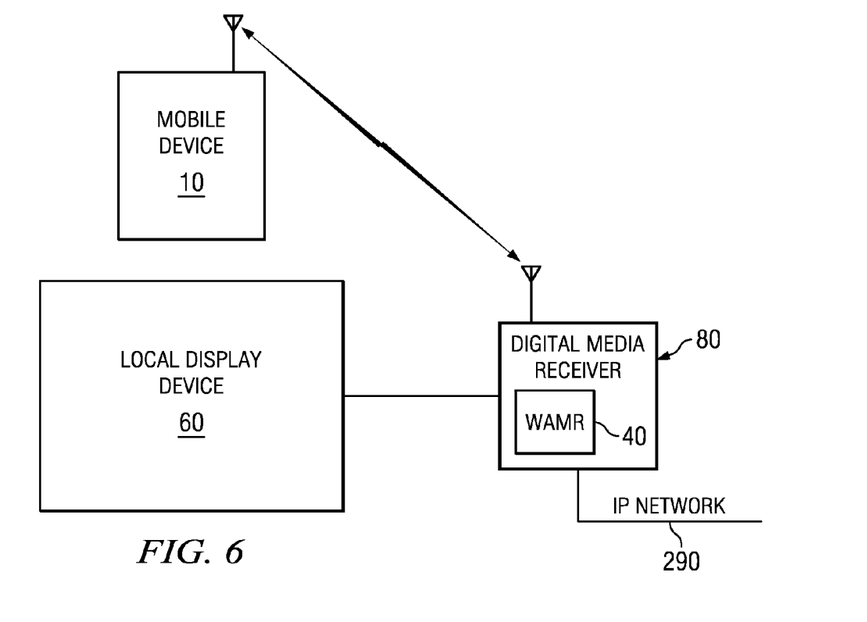
FIGS. 6-9 illustrates various exemplary configurations of the WAMR, in accordance with embodiments of the present invention.

FIGS. 6-9 illustrates various exemplary configurations of the WAMR, in accordance with embodiments of the present invention. In one embodiment, as can be seen in FIG. 6, rather than including the WAMR functionality within a separate WiFi router, as described above, the WAMR functionality 40 can be included within a digital media receiver (DMR) 80 coupled to a local display device 60. Since DMR's 80 typically have WiFi capabilities that can be utilized to communicate with the mobile device 10 and wired IP capabilities that can be utilized to communicate over an IP network 290, the WAMR functionality 40 can be implemented as additional firmware within a modified DMR 80.

Figure 7:
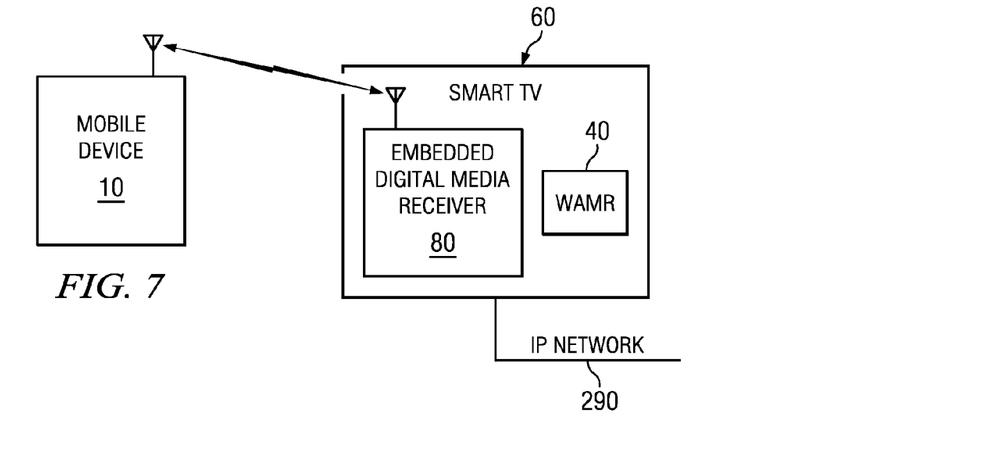

In another embodiment, as depicted in FIG. 7, the WAMR functionality 40 and DMR 80 can be embedded or included directly within a SmartTV (TV), modified HDTV projector or graphical monitoring device (hereinafter referred to as a "display device"). In addition to accepting VGA, HDMI, S-video, and other video input connections, the display device may also accept WiFi client requests from a mobile device, and respond to and initiate tunnel requests over the corporate network or Internet (IP network 290), via its wired IP connection. The display device may be standalone and/or associated with a high-definition whiteboard, or smart whiteboard.

Figure 8:
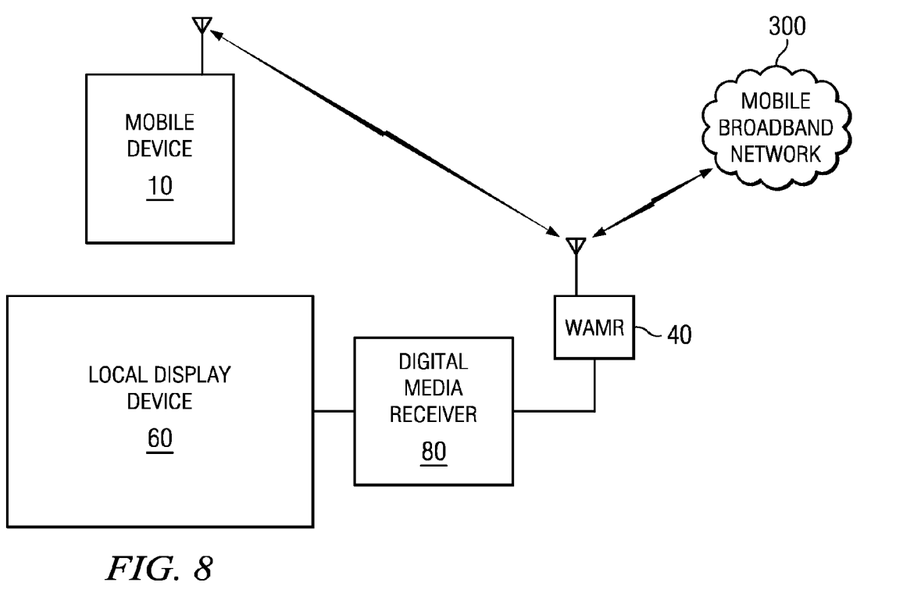

Yet another embodiment of the WAMR is depicted in FIG. 8. In FIG. 8, the WAMR 40 is implemented as a stand-alone device or as part of a WiFi router to communicate wirelessly with mobile devices 10 and to communicate with a DMR 80 coupled to the local display device 60 via a wireless or wired connection. However, the connectivity between WAMRs 40 is accomplished via a high-speed mobile broadband network 300, such as 4G/LTE. For example, a commercially-available LTE dongle (not shown) may be inserted into a USB-port on the WAMR 40. The WAMR 40 may also implement additional firmware drivers to communicate with the USB dongle in order to support Internet access and tunnels.

Figure 9:
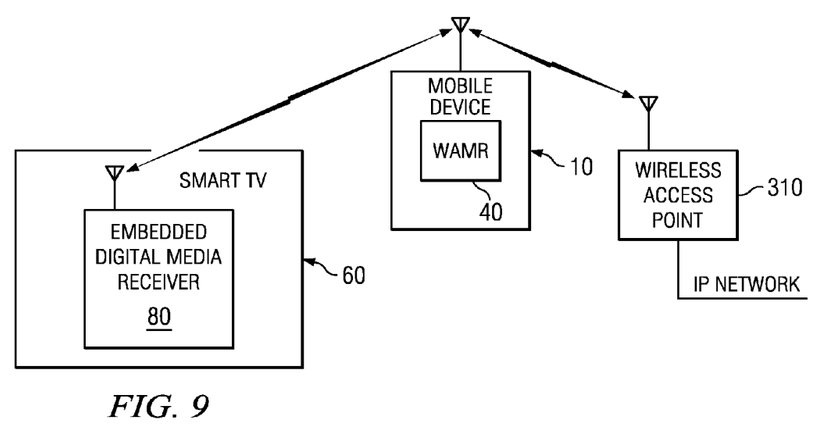

In another embodiment, as shown in FIG. 9, the WAMR functionality 40 is implemented as firmware or a software application downloaded into or otherwise included within the mobile device 40. In this embodiment, the WAMR 40 utilizes the WiFi or other wireless capabilities of the mobile device 10 to communicate with both a wireless access point 310 providing connectivity to a WAN (via IP network) and a DMR 80, which may be embedded into a SmartTV, modified HDTV projector or graphical monitoring device 60. The wireless access point 310 may be a WiFi router, Bluetooth device, cellular base station or other wireless device providing connectivity to a WAN.

Figure 10:
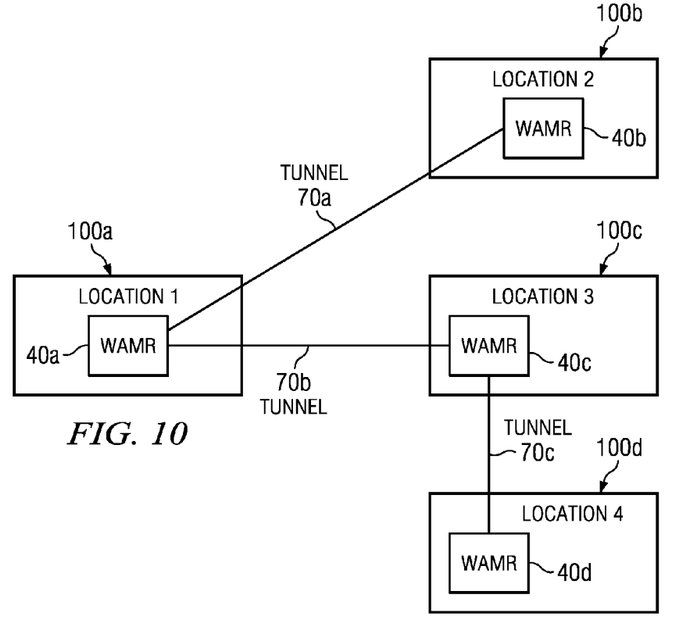
FIGS. 10-11 illustrate exemplary screen mirroring systems employing multiple WAMRs, in accordance with embodiments of the present invention.
Figure 11:
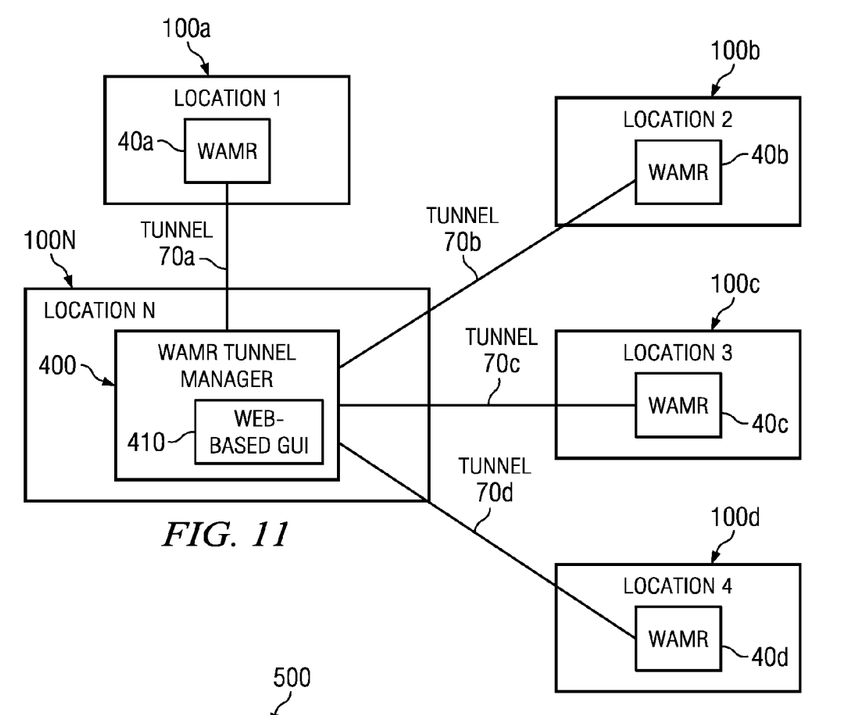

FIGS. 10-11 illustrate exemplary screen mirroring systems employing multiple WAMRs, in accordance with embodiments of the present invention. Two or more WAMRs 40a-40d may be used to provide mirroring connectivity between multiple locations 100a-100d. Each WAMR 40a-40d can be the initiator, or the responder, to a tunnel setup creation request. For example, as shown in FIG. 10, the WAMR 40a at Location 1 can respond to a tunnel 70a setup from the WAMR 40b at Location 2, while also acting as the initiator of a tunnel 70b to a WAMR 40c at Location 3. Thus, the WAMR 40a in Location 1 is acting as a bridge to enable mobile devices and display devices (DMRs) in Locations 1, 2 and 3 to discover and connect to one another. Similarly, the WAMR 40c in Location 3 can act as a tunnel 70c initiator to the WAMR 40d in Location 4, so that the WAMR 40c in Location 3 bridges itself and the WAMR's 40a and 40d in Location 1 and Location 4. Since WAMRs 40a and 40c are acting as bridges for different locations, mobile device users at any location can minor to their own or any other DMR in the four locations.

However, in the embodiment shown in FIG. 10, after a WAMR initiates or responds to a first tunnel request, additional tunnel initiations or responses may be disabled to prevent a user in another location from accidentally (or intentionally) stealing mirroring to a particular DMR. For example, if there is an existing tunnel 70a between WAMR 40a and WAMR 40b, and another existing tunnel 70b between WAMR 40a and WAMR 40c and a user in Location 2 is making a presentation to users viewing a DMR/display device in Location 1, a user in Location-3 could potentially interrupt the presentation by selecting this very same DMR/display device for his/her mirroring.

Therefore, in an exemplary embodiment, only a single tunnel to/from a particular WAMR may be supported at a time, and control software within the WAMRs 40 could enable/disable this. For example, when Location 1 and Location 2 are in a collaboration session, a user at another location could not interrupt the mirroring. When this session ends and a new session collaboration between Location 1 and Location 3 is desired, the old tunnel 70a (between Location 1 and Location 2) would be torn-down, and a new tunnel 70b (between Location 1 and Location 3) would be established. Users at Location 2, who are no longer associated with the present collaboration, could not interrupt a mirrored presentation. The tunnel tear-down and setup could be established automatically, for example, by tunnel-control software coupled to a calendar-based scheduler, or by conference room administrators following suitable policies, or by other means.

In another embodiment, as depicted in FIG. 11, each WAMR 40a-40d could be configured to setup a respective tunnel 70a-70d with a WAMR tunnel manager 400 at the same location as one of the WAMR's 40a-40d or a different location 100N (Location N). The WAMR tunnel manager 400 can bridge the tunnels 70-70d together to enable a mobile device within any location to minor content to a DMR/display device within any location. In an exemplary embodiment, the tunnel manager 400 has a web-based GUI 410, which enables authorized users to select which tunnels to connect together for a current mirroring session, to reserve and schedule tunnels for future mirroring sessions, to setup do-not-disturb, or to implement various prioritization schemes, so as to determine which tunnels 70a-70d are active at any one time, thereby limiting undesired interruptions.

Figure 12:
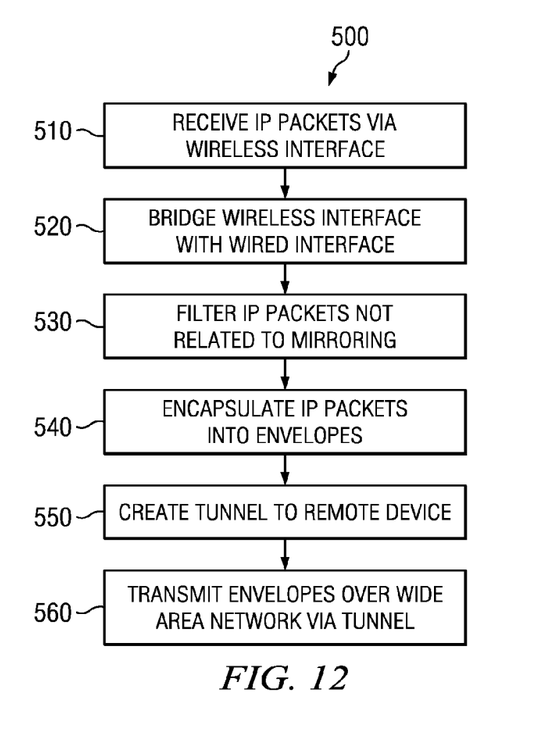
FIG. 12 illustrates an exemplary process for mirroring content displayed on a screen of a mobile device to a remote display device across a wide area network, in accordance with embodiments of the present invention.

FIG. 12 is a flowchart illustrating an exemplary process 500 for mirroring content displayed on a screen of a mobile device to a remote display device across a wide area network (WAN), in accordance with embodiments of the present invention. The process begins at block 510, where a wide area mirroring router (WAMR) receives IP packets, which may include IP multicast packets, from a mobile device via a wireless interface supporting a direct wireless communication link with the mobile device. At block 520, the WAMR bridges the wireless interface with a wired interface to transmit the IP packets to a remote location via the WAN. At block 530, the WAMR filters the IP packets to prevent IP packets not related to mirroring from being transmitted. Then, at block 540, the WAMR encapsulates the filtered IP packets into envelopes, and at block 550, creates a tunnel through the WAN to another WAMR coupled to the remote display device. Finally, at block 560, the WAMR transmits the envelopes over the WAN via the tunnel.

As will be recognized by those skilled in the art, the innovative concepts described in the present application can be modified, varied and adapted over a wide range of applications. Accordingly, the scope of the subject matter is not limited to any of the specific exemplary teachings discussed, but is instead defined by the following claims.

The invention claimed is:

1. An apparatus, comprising:
a processor for receiving Internet Protocol (IP) packets from a mobile device, the IP packets including multicast packets that enable the mobile device to discover and connect to a remote display device and unicast packets containing mirrored content, the mirrored content being displayed on the mobile device and mirrored to the remote display device for display thereon via the unicast packets, the processor further for encapsulating the IP packets into envelopes for transmission via a tunnel to the remote display device; and
an interface for communicating the envelopes to the remote display device via the tunnel over a wide area network;
wherein the processor further provides a virtual Ethernet bridge for bridging a wireless domain coupling the mobile device to the apparatus and a wired domain coupling the apparatus to the wide area network.

2. The apparatus of claim 1, wherein the multicast packets are multicast domain name system (DNS) packets.

3. The apparatus of claim 1, wherein the apparatus is a wireless router in wireless communication with the mobile device and the interface is a network interface.

4. The apparatus of claim 1, wherein the apparatus is a digital media receiver, TV, projector or graphical monitoring device.

5. The apparatus of claim 1, wherein the processor further filters the IP packets to prevent packets unrelated to mirroring of the content from being encapsulated into the envelopes.

6. The apparatus of claim 5, further comprising:
a memory maintaining IP tables, the processor using the IP tables to filter the IP packets.

7. The apparatus of claim 1, wherein the processor further encrypts data contained within the IP packets prior to encapsulating the IP packets into the envelopes.

8. The apparatus of claim 1, wherein the wireless domain is a wireless local area network (LAN) and the wired domain is a wired LAN.

9. The apparatus of claim 1, wherein the processor further receives additional content mirrored from a remote mobile device via the interface through an additional tunnel and transmits the additional content to a local display device for display of the additional content thereon.

10. The apparatus of claim 1, wherein the mobile device is a remote mobile device and the processor further receives the IP packets via the interface through an additional tunnel and bridges the tunnel and the additional tunnel together.

11. The apparatus of claim 1, wherein the mobile device is a tablet or smartphone.

12. A wide area mirroring router, comprising:
- a transceiver in wireless communication with a mobile device for receiving Internet Protocol (IP) packets from the mobile device, the IP packets including multicast packets that enable the mobile device to discover and connect to a remote display device and unicast packets containing mirrored content, the mirrored content being displayed on the mobile device and mirrored to the remote display device for display thereon via the unicast packets;
- a processor for encapsulating the IP packets into envelopes for transmission via a tunnel to the remote display device;
- a network interface for communicating the envelopes to a digital media receiver coupled to the remote display device via the tunnel over a wide area network;
- a memory maintaining IP tables;
- a virtual Ethernet bridging module executable by the processor for bridging a wireless domain coupling the mobile device to the wide area mirroring router and a wired domain coupling the wide area mirroring router to the wide area network;
- a filtering module executable by the processor for filtering the IP packets, using the IP tables, to prevent packets unrelated to mirroring of the content from being encapsulated into the envelopes; and
- a virtual private network (VPN) adapter module for creating the tunnel and encapsulating the IP packets into the envelopes for transmission via the tunnel.

13. The wide area mirroring router of claim 12, wherein the tunnel is a User Datagram Protocol (UDP) or Transmission Control Protocol (TCP) tunnel.

14. The wide area mirroring router of claim 12, wherein the transceiver communicates with the mobile device via a WiFi communication link.

15. The wide area mirroring router of claim 12, wherein the multicast packets are multicast Domain Name System (DNS) packets.

16. The wide area mirroring router of claim 12, wherein the wide area network includes at least one of a corporate or campus Local Area Network (LAN), corporate or public Wide Area Network (WAN), Mobile Broadband Network and the Internet.

\* \* \* \* \*